(12) United States Patent
Robert

(10) Patent No.: US 7,810,387 B2
(45) Date of Patent: Oct. 12, 2010

(54) ELECTRONIC MODULE DESIGNED TO BE INCORPORATED IN A TIRE SYSTEM COMPRISING SUCH A MODULE, TIRE FITTED WITH SUCH A SYSTEM AND METHOD OF OBTAINING SUCH A SYSTEM

(75) Inventor: Michel Robert, Cellule (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 631 days.

(21) Appl. No.: 11/804,099

(22) Filed: May 17, 2007

(65) Prior Publication Data

US 2007/0274030 A1   Nov. 29, 2007

(30) Foreign Application Priority Data

May 19, 2006   (FR) .................................. 06 04638

(51) Int. Cl.
*G01M 17/02* (2006.01)
(52) U.S. Cl. ....................................................... 73/146
(58) Field of Classification Search ...................... None
See application file for complete search history.

(56) References Cited

U.S. PATENT DOCUMENTS

| 5,667,390 | A | 9/1997 | Keng | |
|---|---|---|---|---|
| 7,084,750 | B2 * | 8/2006 | Johanning et al. | 340/447 |
| 7,116,213 | B2 * | 10/2006 | Thiesen et al. | 340/10.1 |
| 7,129,828 | B2 * | 10/2006 | Cook | 340/447 |
| 7,180,410 | B2 * | 2/2007 | Logan et al. | 340/447 |
| 7,196,617 | B2 * | 3/2007 | Sinnett et al. | 340/445 |
| 2003/0132893 | A1 | 7/2003 | Forster | |

FOREIGN PATENT DOCUMENTS

| EP | 0 689 950 A2 | 5/1995 |
|---|---|---|
| EP | 1 589 614 A1 | 10/2005 |

* cited by examiner

*Primary Examiner*—Lisa M Caputo
*Assistant Examiner*—Jermaine Jenkins
(74) *Attorney, Agent, or Firm*—Cohen Pontani Leiberman & Pavane LLP

(57) ABSTRACT

An electronic module designed to be incorporated in a tire, comprising a functional device, a support and at least one device for electrically connecting a wire and a device for mechanically fixing the wire, separate from the electrical connection device, for mechanically fixing the wire to the support.

19 Claims, 1 Drawing Sheet

ELECTRONIC MODULE DESIGNED TO BE INCORPORATED IN A TIRE SYSTEM COMPRISING SUCH A MODULE, TIRE FITTED WITH SUCH A SYSTEM AND METHOD OF OBTAINING SUCH A SYSTEM

FIELD OF THE INVENTION

The present invention relates to an electronic module designed to be incorporated in a tire, an electronic system comprising such a module, a tire fitted with such a system and a method of obtaining such a system.

BACKGROUND OF THE INVENTION

Incorporating an electronic tire identification or monitoring system in a vehicle tire, for example an electronic system for measuring the pressure or the temperature of the tire, is known.

Such an electronic device normally comprises an electronic module of small dimensions, such as an electronic chip, linked to an electrical wire forming an antenna for transmitting data supplied by the module or receiving energy. The electronic module then comprises at least one device for electrically connecting the wire.

The electronic system is, for example, incorporated in the tire by being glued to its surface or by being embedded in its mass. Consequently, while the motor vehicle is in normal use, the electronic system is subject to stresses generated by the deformations of the tire.

The wire (because of its flexibility) and the electronic module (because of its small dimensions and its rigidity) correctly withstand these stresses. However, the junction between the wire and the electronic module is particularly sensitive to these stresses.

To link the electrical wire to the electronic module, two types of junction are known.

The wire can be connected to the electrical connection device of the electronic module by soldering. However, a solder joint does not make it possible to obtain a junction that is robust enough to withstand the repeated mechanical stresses generated by the deformations of the tire.

The wire can also be connected to the electrical connection device by crimping. Crimping provides for a good mechanical fixing but does not provide an assurance of a reliable electrical link.

SUMMARY OF THE INVENTION

One object of the invention is to remedy the drawbacks of the known junctions by providing an electronic module designed to be incorporated in a tire and comprising means making it possible to provide an electrically and mechanically reliable link with a wire.

To this end, the subject of the invention is an electronic module designed to be incorporated in a tire, comprising a functional device mechanically fixed to a support and at least one device for electrically connecting a wire to the functional device and a device for mechanically fixing the wire, separate from the electrical connection device, for mechanically fixing the wire to the support.

An embodiment of the inventive electronic module has two separate connection devices respectively providing an electrical connection function and a mechanical fixing function. This makes it possible to design separately each of the devices so as to optimize their function. Thus, with the invention, an electronic module can be obtained that comprises means that make it possible to provide an electrically and mechanically reliable link with a wire.

Preferably, the device for mechanically fixing the wire comprises crimping means. The crimping means in practice provide for a mechanically quick and effective fixing.

Optionally, the device for mechanically fixing the wire comprises snap fitting means and/or gluing means.

Preferably, the module comprises, for the wire, a passage terminating at the electrical connection device, the mechanical fixing device being positioned on the passage, upstream of the electrical connection device. This arrangement of the connection and fixing devices on the module is particularly interesting when the wire is connected to the electrical connection device by soldering by means of solder. In practice, in the case where the wire is made up of an assembly of multiple small-diameter strands, the solder has a tendency to penetrate between these strands by capillary action and thus increase the rigidity of the assembly. The device for mechanically fixing the wire then prevents this solder penetration, which enables the wire to retain all of its flexibility potential.

Optionally, the mechanical fixing device is shaped to be applied to an outer insulation of the wire.

Another subject of the invention is an electronic system designed to be incorporated in a tire, characterized in that it comprises an electronic module as previously defined and at least one wire comprising a section linked to the module and a free section, the linked section of the wire being connected to the electrical connection device and fixed to the module by means of the mechanical fixing device. Preferably, the wire is connected to the electrical connection device by soldering. Optionally, the electronic system also comprises a jacket protecting the module and the linked section of the wire. The function of this protective jacket is, on the one hand, to protect the module, and on the other hand, to limit the disturbances of the tire generated by the module.

Preferably, the jacket also covers a part of the free section of the wire so as to form means of guiding the free section, for example by guiding the free section in a rectilinear manner.

If necessary, the electronic system comprises two wires connected to the module, the jacket being shaped in such a way that the free sections of the wires are roughly coaxial.

Thus, the forces exerted by the two wires on the electronic module tend to be compensated. Preferably, the guiding means are of increasing rigidity in the direction of the module. This makes it possible to provide a gradual mechanical transition between the electronic module which is rigid and the wire which is flexible. Thus, the stresses due to the deformations of the tire are not localized at the junction between the electronic module and the wire, but progressively distributed.

According to a first variant, the jacket is made of a resin molded onto the module and the wire. According to a second variant, the jacket comprises a case containing the module, the case being filled with resin. For example, the case is formed by two half-shells.

Preferably, the jacket is roughly in the shape of a roller, that is, a shape that limits the disturbances of the tire generated by the system. In particular, in the case where the electronic system is embedded in the mass of the tire, a roller- or oval-shaped jacket makes it possible to avoid trapping air in the tire, in contact with the electronic system. Another subject of the invention is a vehicle tire in which is incorporated an electronic system as previously defined. Another subject of the invention is a method of obtaining an electronic system as previously defined, characterized in that the wire is fixed before it is soldered. In this way, fixing the wire prevents the solder from penetrating along the wire by capillary action.

BRIEF DESCRIPTION OF THE DRAWINGS

The invention will be better understood from reading the description given with reference to the appended figures in which.

DETAILED DESCRIPTION OF THE DRAWINGS

Figure 1:
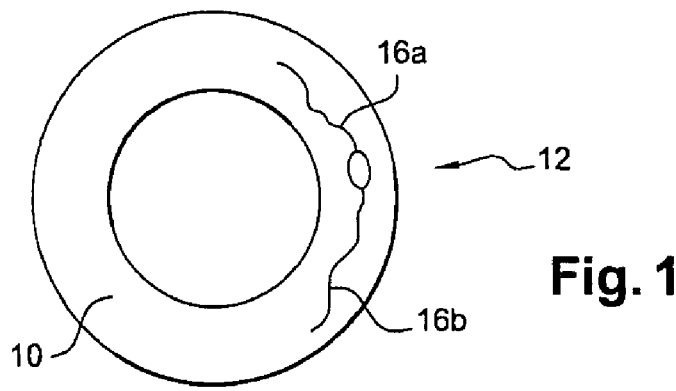
FIG. 1 is a diagram of a tire provided with an electronic system according to the invention.

FIG. 1 shows a tire, designated by the general reference 10, provided with an electronic system 12 according to the invention. In the example shown, the electronic system 12 is embedded in a side of the tire 10. The modules according to the invention can also be embedded in rubber patches designed to be glued to the interior wall of a tire or of the deformable elements used in a vehicle's suspension.

Figure 2:
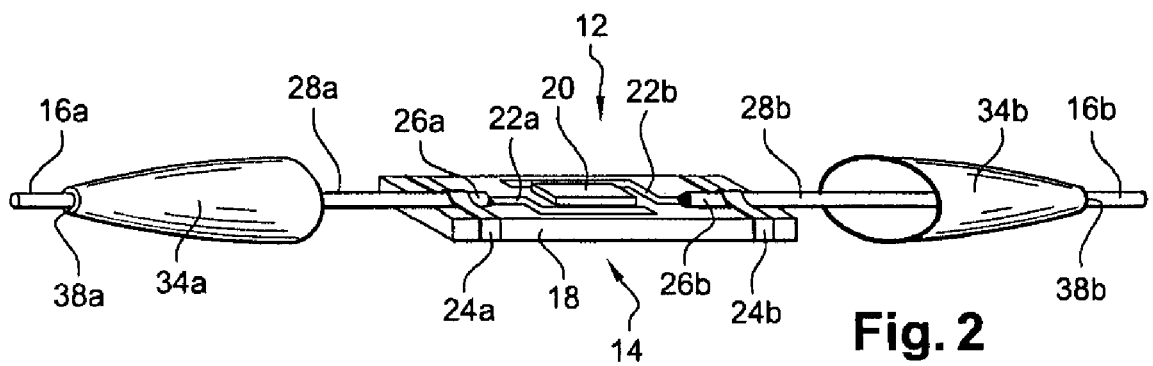
FIG. 2 is an exploded diagram of the electronic system represented in FIG. 1.

The electronic system 12 is shown in more detail in FIG. 2. It comprises an electronic module 14 and first 16a and second 16b electrically conductive wires.

The electronic module 14 comprises a support 18 and a functional device 20 supported by the support 18. The functional device 20 is, for example, a pressure sensor, a temperature sensor or a system identifying the tire such as an RFID (Radio Frequency Identification Device) system.

The support 18 comprises first 22a and second 22b electrical connection devices to which the wires 16a and 16b are respectively connected by soldering. The solder joint is obtained conventionally by means of solder. The connection devices 22a and 22b are made up of conductive strips positioned on the surface of the support 18. The functional device 20 is also connected to the electrical connection devices 22a and 22b.

The electrical connection devices 22a and 22b therefore make it possible to establish an electrical link between the functional device 20 and the wires 16a and 16b.

The support 18 also comprises rings 24a, 24b for crimping the wires 16a and 16b, forming devices 24a, 24b for mechanically fixing the wires.

Each wire 16a and 16b comprises a section 26a, 26b linked to the module 14 and a free section 28a, 28b. Each linked section 26a, 26b is connected by soldering to the electrical connection device 22a and 22b and fixed to the module by means of the crimping rings 24a, 24b.

The crimping rings 24a, 24b mechanically fix the wires 16a and 16b to the support 18, whereas the solder joint of the sections 26a, 26b linked to the electrical connection devices 22a and 22b provides the electrical link between the wires and the functional device 20.

Each crimping ring 24a, 24b is placed between the free section 28a, 28b of the wire and the electrical connection device 22a and 22b. Thus, the part of the electronic module that supports the linked section of the wire 16a, 16b defines a passage terminating at the electrical connection device, the mechanical fixing device being positioned on the passage, upstream of the electrical connection device.

With this arrangement of the wire fixing and connection devices, forces exerted on the free section of the wire 16a, 16b are fully taken up by the crimping rings 24a and 24b. In particular, the forces exerted on the solder joint between the wire 16a, 16b and the electrical connection device 22a and 22b are very weak, which makes it possible to obtain a good withstand strength of this solder joint over time and therefore a good electrical link between the wire and the functional device 20.

Furthermore, it is advantageous to solder the wire to the electrical connection device after having crimped it. In practice, the crimping ring then prevents the solder of the solder joint from penetrating into the free section of the wire by capillary action.

The electronic system 12 also comprises a jacket 30 protecting the electronic module 14. This jacket 30, represented in FIGS. 2 and 3, comprises, on the one hand, a case 32 formed by two half-shells 34a and 34b, and on the other hand, resin 36 filling the case 32. The resin prevents the electronic module 14 from shifting inside the case 32 which protects it from the shocks to which the electronic system can be subjected.

Figure 3:
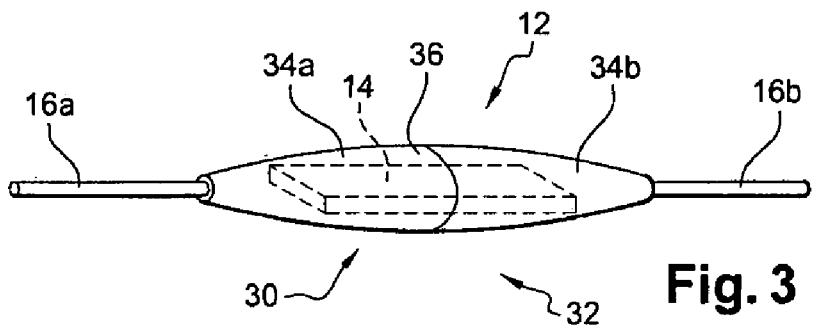
FIG. 3 is a diagram of the electronic system of FIG. 2.

FIG. 2 shows the electronic system 12 before the two half-shells 34a and 34b are fitted on the electronic module, and FIG. 3 shows the electronic system 12 after the two half-shells 34a and 34b have been fitted.

The two half-shells 34a and 34b each have a roughly conical shape. The bases of the cones are in contact with each other when the half-shells are fitted on the electronic module. Each half-shell 34a and 34b partly covers the free section 28a, 28b of the wire so as to form rectilinear means of guiding the free section. To this end, the peak of each half-shell comprises an orifice 38a, 38b through which the free section of the wire passes.

With its conical shape, each half-shell 34a and 34b forms wire guiding means of decreasing rigidity from its base to its peak, that is, the rigidity of the guiding means increases in the direction of the electronic module 14. This provides for a good distribution of the stresses exerted on the electronic system 12 when it is incorporated in the tire 10. In the absence of these guiding means of increasing rigidity, the stresses would be localized on the crimping rings 24a, 24b which would increase the fragility of the link between the wire and the electronic module.

Finally, the half-shells 34a, 34b are positioned so that the free sections 28a, 28b of the two wires are roughly coaxial. Thus, the forces exerted by the wires on the electronic module 14 tend to be compensated.

The invention is not limited to the embodiment previously described.

Figure 4:
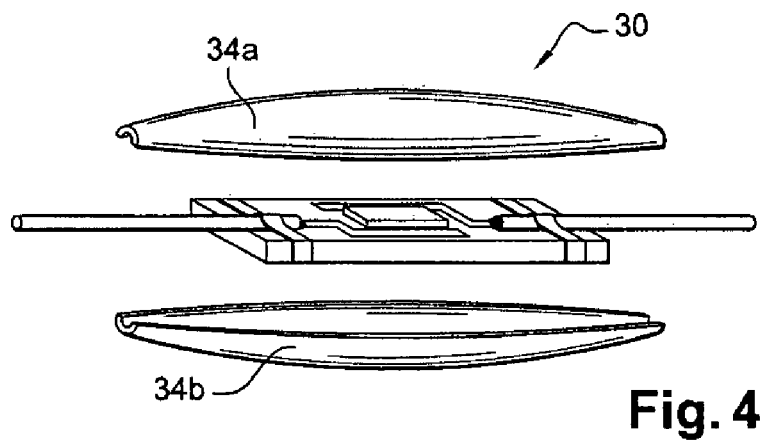
FIG. 4 is a diagram of a variant of the electronic system represented in FIG. 2.

In practice, FIG. 4 shows an electronic device according to the invention comprising a variant of the two half-shells of the case 32.

According to another variant that is not shown, the jacket is made up of resin molded onto the module and the wire in one or more layers of decreasing rigidity successively molded on according to the appropriate shape. These resins can be made of a thermoplastic or thermosetting or rubber material.

The invention is not limited to the examples described and represented, and various modifications can be made to it without departing from its scope defined by the appended claims.

The invention claimed is:

1. An electronic module designed to be incorporated in a deformable element such as a tire, a patch for tire or a deformable element used in the suspension of a vehicle, comprising:
   a functional device fixed to a support;
   at least one electrical connection device for electrically connecting a wire to the functional device; and a mechanical fixing device for mechanically fixing the wire to the support, separate from the electrical connection device, between a free section of the wire and a solder connection of the electrical connection device with the wire, wherein the mechanical fixing device is configured to fully take up forces exerted on the free section of the wire.

2. The module according to claim 1, wherein the mechanical fixing device comprises crimping means.

3. The module according to claim 1, wherein the mechanical fixing device comprises snap-fitting means.

4. The module according to claim 1, wherein the mechanical fixing device comprises gluing means.

5. The module according to claim 1, comprising:
a passage for the wire terminating at the electrical connection device, wherein the mechanical fixing device is positioned on the passage upstream of the electrical connection device.

6. The module according to claim 1, wherein the mechanical fixing device is shaped to be applied to an outer insulation of the wire.

7. An electronic system designed to be incorporated in a tire, comprising:
the module according to claim 1, wherein
the wire is at least one wire of the electronic system comprising a section linked to the module and the free section, wherein the linked section of the wire is connected to the electrical connection device and fixed to the module by means of the mechanical fixing device.

8. The system according to claim 7, comprising:
a jacket protecting the module and the linked section of the wire.

9. The system according to claim 8, wherein the jacket protects a part of the free section of the wire so as to form means of guiding the free section.

10. The system according to claim 9, wherein the guiding means guide the free section in a rectilinear manner.

11. The system according to claim 10, comprising:
two wires connected to the module, wherein the jacket is shaped such that the free sections of the two wires are roughly coaxial.

12. The system according to claim 9, wherein the guiding means are of increasing rigidity in the direction of the module.

13. The system according to claim 8, wherein the jacket is made of a resin molded onto the module and the wire.

14. The system according to claim 8, wherein the jacket is made up of a plurality of layers of resins of decreasing rigidity successively molded onto the module and the wire.

15. The system according to claim 8, wherein the jacket comprises a case containing the module and the resin filling the case.

16. The system according to claim 15, wherein the case is formed by two half-shells.

17. The system according to claim 8, wherein the jacket is roughly in the shape of a roller.

18. A vehicle tire that incorporates the electronic system according to claim 7.

19. A method of obtaining a system according to claim 7, wherein the wire is fixed before the solder connection is soldered.

* * * * *